Aug. 8, 1961  F. SUND  2,995,194
ROCK PICKER WITH OVERLOAD AND CLEARANCE RELEASE
Filed Oct. 8, 1958  2 Sheets-Sheet 1
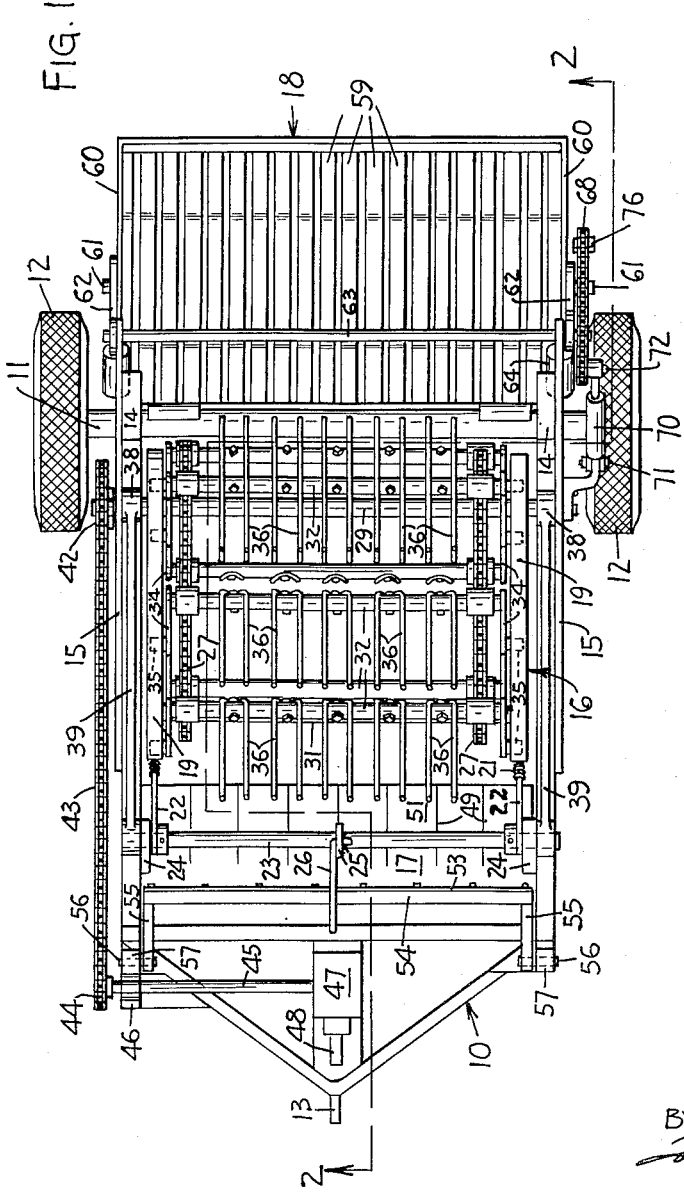
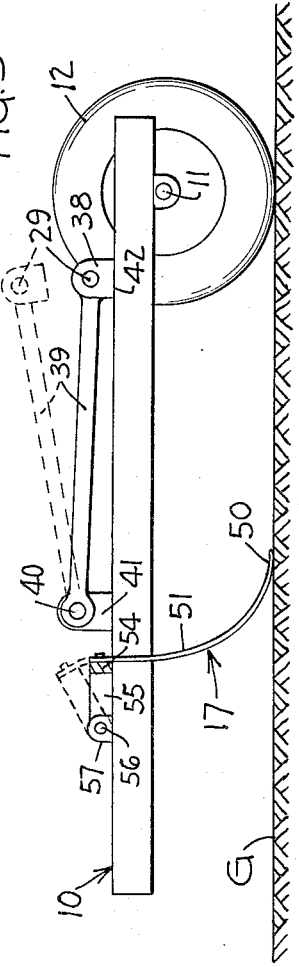
INVENTOR
FRED SUND
BY
ATTORNEY Aug. 8, 1961 F. SUND 2,995,194
ROCK PICKER WITH OVERLOAD AND CLEARANCE RELEASE
Filed Oct. 8, 1958 2 Sheets-Sheet 2

INVENTOR
FRED SUND
BY Frederick C. Meyers
ATTORNEY

_United States Patent Office_

2,995,194
Patented Aug. 8, 1961

2,995,194
ROCK PICKER WITH OVERLOAD AND
CLEARANCE RELEASE
Fred Sund, Newburg, N. Dak.
Filed Oct. 8, 1958, Ser. No. 766,003
6 Claims. (Cl. 171—63)

This invention relates to rock pickers, and more particularly to an improved mobile rock picker of the type having traveling tine members.

In my previous Patent No. 2,812,029, I disclose a rock picker of the same general type which constitutes the present invention, the former presenting certain difficulties which are overcome by the invention disclosed herein. The patented structure has a traveling tine pick-up which works against a dragging flap or flexible sheet for scooping up rocks and stones which are rolled against the rear surface thereof. As the rocks and stones are tumbled, the dirt is at least partially removed therefrom and they are then gathered in a basket which is periodically raised from a position close to the ground to a higher position where the basket is dumped. My patented structure operates with high efficiency in ground containing average sized rocks and stones. It will not, however, accommodate large rocks which are attempted to be gathered after loosening or those which remain firmly embedded in the ground.

More specifically, the flap arrangement of the patented structure, if positioned to clear large rocks, will not efficiently pick up the small ones. Conversely, if the clearance is proper for small rocks, the large ones will jam the machine. Also, the position of the tines with respect to the frame in my patented device is such that if a rock too large to be moved was encountered, the tines would break, shear their mounting pins, or raise the entire machine. Occasionally if the machine raised and the tines merely scraped over the surface of a large rock, there is still the danger of breaking the bucket or its associated parts when it struck the rock.

It is, therefore, a general object of the present invention to overcome the difficulties encountered with prior art rock pickers of the revolving type and to provide an improved machine which will either accept or reject a large rock and, in either case, will not damage the equipment.

Another object of the invention is to provide a special flexible sheet or flap mounting for the efficient gathering of both small and large rocks, the sheet and its mounting being so constructed as to give relief without jamming if an oversized rock is gathered by the tines.

A further object of the invention is to provide a revolvable pick-up member which is so mounted as to maintain proper relation with respect to the forward flexible sheet and rearward bucket, yet will be capable of temporarily yielding to bypass an immovable rock without injuring the machine or requiring subsequent readjustment of the parts.

Another object of the invention is to provide a bucket assemblage which is arranged for its stability both in its raised and lowered positions and wherein gravity alone will keep the bucket in its lowered position unless a large rock is encountered, in which event the bucket is capable of yielding upwardly until the rock has been passed.

A still further object of the invention is to provide a cooperative interrelation between the revolvable pick-up element and the bucket member so that relief will be automatically attained should the bucket become overloaded with rocks.

These and other objects and advantages of my invention will more fully appear from the following description, made in connection with the accompanying drawings, wherein like reference characters refer to the same parts throughout the several views and in which:

FIGURE 1 is a top plan view of my improved rock picking device;

FIGURE 3 is a vertical section of a segment of the rock picker frame showing the flexible sheet mounting structure and the pivotal arm mounting for the revolvable pick-up element, other portions of the rock picker having been removed to better show the relationship of the mounting parts, the dotted line positions indicating the relief movement of the mounting parts.

Figure 2:
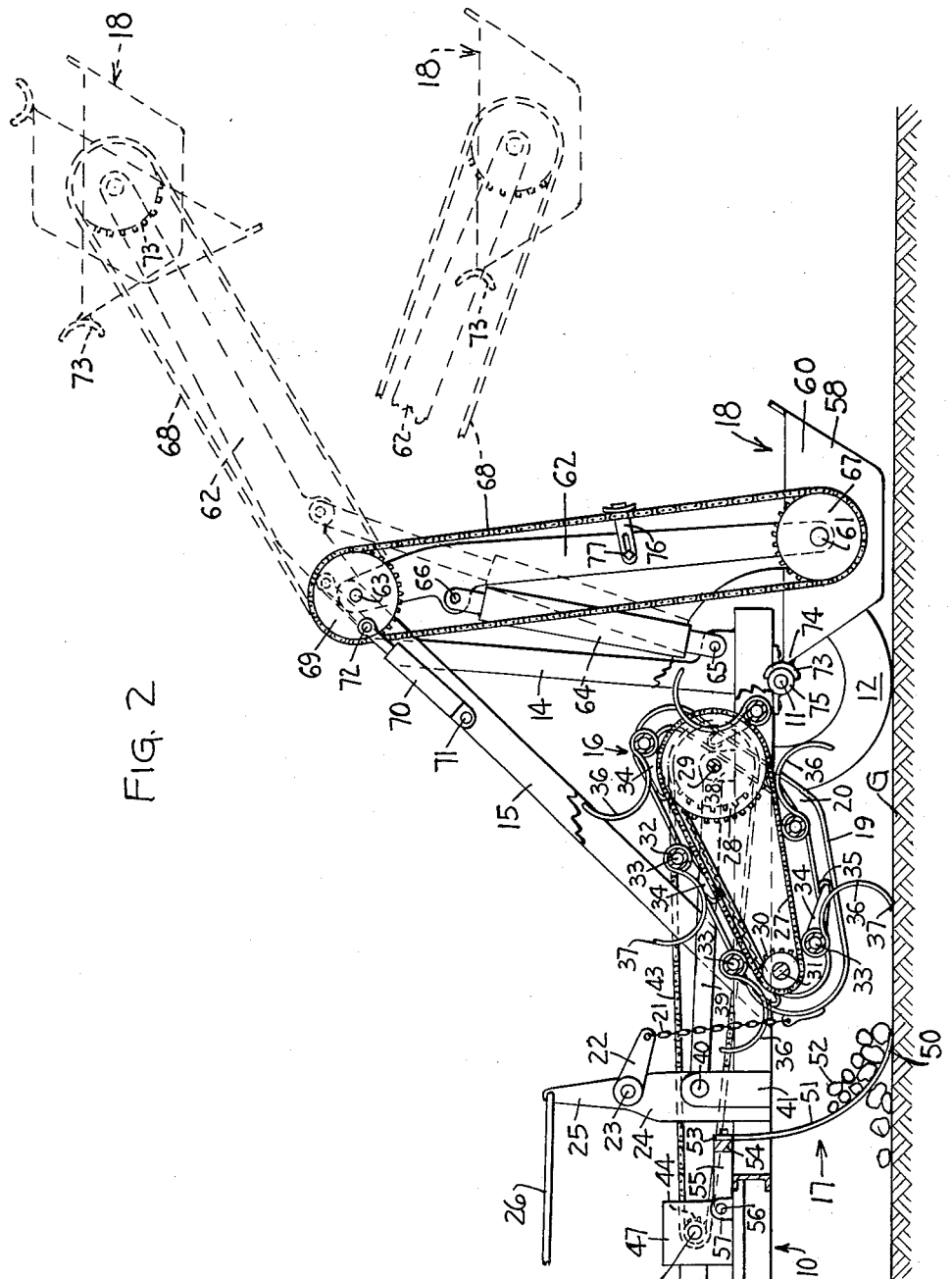
FIGURE 2 is a vertical section taken on the line 2—2 of FIGURE 1.

With continued reference to the drawings, my rock picker is supplied with a main frame structure indicated generally at 10 which, in turn, is supported upon axle 11 carrying a pair of spaced rubber tired wheels 12 for traveling along rocky and stony ground. The forward portion of the frame structure 10 converges into a draw bar 13 so that the picker can be drawn behind a vehicle such as a tractor (not shown). At the rear portion of framework 10 are a pair of spaced parallel upright members 14 which are secured at their upper ends to elongated members 15 respectively, the latter being angulated so as to extend from a position upwardly and rearwardly of the uprights 14, then downwardly and forwardly to securement at the sides of the framework 10, as shown in FIG. 2.

The working portions of the rock picker comprise generally a revolvable pick-up element 16 mounted intermediate the ends of framework 10, a flexible sheet member 17 for cooperating with the revolvable pick-up element 16 in concentrating and tumbling rocks and stones as well as earth which may cling to the rocks and stones, and the discharge bucket assemblage 18 which is suspended from the upper end of the diagonal member 15 and located downwardly and rearwardly from the revolvable pick-up element 16, therefore receiving rocks therefrom as shown in FIG. 2.

The revolvable pick-up element 16 comprises a pair of spaced cam plates 19, each having a cammed groove or track 20 disposed in horizontally spaced confronting relation with the other, as shown in FIG. 1. The forward ends of the cam plates 19 are each secured to a retractable member such as the chain 21, each of the chains extending upwardly where they are secured to respective arms 22, as shown in FIGS. 1 and 2. The arms 22 are radially secured to a transverse shaft 23 which is journaled across the bearing brackets 24, in turn mounted one at each side of the frame 10. The shaft 23 has a crank arm 25 secured thereto intermediate the ends of shaft 23 which, in turn, is pivotally secured to an operating rod 26 extending forwardly to be held and actuated by such means as a hydraulic ram (not shown). Actuation of the crank rod 26 in a forward direction will tend to raise the front end of the revolvable pick-up element and, conversely, moving the rod 26 rearwardly will permit the revolvable pick-up element 16 to drop at its forward portion.

The revolvable pick-up element has a pair of suitable endless chains 27, one at each side of the device and adjacent its associated cam plate 19. Each endless chain is mounted on a pair of rear sprocket wheels 28 which, in turn, are mounted upon a common shaft 29 and rotate therewith. Each of chains 27 also are trained about a pair of forward sprockets 30 which are rotatably mounted on shaft 31 lying in spaced parallel relation to shaft 29 and forwardly and downwardly therefrom. Each of the shafts 29 and 31 is journaled across cam plates 19 and lie in spaced parallel relation to the other.

Each of the chains 27 has secured thereto in spaced relation therealong a plurality of bearing lugs 32, each of the lugs being in transverse alignment with a corresponding lug on the opposed chain 27. Each corresponding pair of bearing lugs 32 rotatably carry a shaft 33, all of said shafts 33 lying in spaced parallel relation and transversely of the direction of travel of the rock picker.

The outer ends of the shafts 33 extend beyond their respective bearing members 32 and have rigidly secured thereto radial links or arms 34, as shown in FIG. 2. The arms 34 each have roller elements 35 offset laterally from the ends thereof and adapted to ride in the cammed guideway or track 20 in each of the cam plates 19.

Each of the shafts 33 has a plurality of teeth or tines 36 disposed therealong in rigid relation and being curved concavely forward in the direction of travel of the chain 27, as viewed in FIG. 2, and terminating in free ends 37, as shown. It will be observed that the shafts 33, together with their tine members 36, will travel generally forward and downwardly in the lower flight of their travel and will reverse in passing from the lower to the upper flight where they will travel upwardly and rearwardly. The teeth or tines 36 may be formed in pairs with the inner ends curved to fit about shaft 34 and to be secured thereto by such means as a bolt passing through the shaft. As the roller chains 27 travel forwardly in the lower flight, the cam tracks 20 pass below the chains 27 and cause the rollers 35 to separate a greater distance from the corresponding chain 27. This causes the arms 34 also to swing away from the chains 27 and thereby bring the tine points 37 outwardly and forwardly in the direction of travel of the chains 27. As the chains reverse in the upper flight to travel rearwardly, the cam track 20 more nearly coincides with the chain 27 itself. The cam rollers 35 will then be retracted toward the corresponding chain 27 and cause each of arms 34 and shaft 33 to turn in a counterclockwise direction as viewed in FIG. 2, to thereby bring the tines 36 closer to the plane defined by the upper flight. Rocks and stones caught by the tines will thus be cradled at a natural angle while being raised prior to dumping.

An important feature of the invention resides in the mounting means for the revolvable pick-up element. The ends of shaft 29 extend through bearing blocks 38 and these bearing blocks are each secured to a mounting arm 39 which extends forwardly along the sides of framework 10 and are mounted at respective ends of a shaft 40 which, in turn, is mounted in the bearing brackets 41 in turn rigidly secured to framework 10 somewhat forwardly of the revolvable pick-up element 16. Each of the bearing blocks 38 themselves provide for abutting structure which is adapted to rest upon the framework 10 so as to support the revolvable pick-up element with the weight thereof normally holding the arms 39 in lowermost position. With the revolvable pick-up element 16 in the position shown in FIG. 2, the curved tines 36 will tend to dig into the ground G and raise rocks and stones therefrom. The travel of the tines 36 with respect to the ground combines both the forward travel of the frame 10 and the forward travel of the tine along with chain 27 in its lower flight. When properly digging into the ground, the tines 36 will tend to pull the entire revolvable pick-up element downwardly and hence keep the abutment surfaces of the bearing blocks 38 in firm contact with framework 10. However, if an immovable stone or other object is encountered by a tine 36, then the entire revolvable pick-up element will raise, pivoting the arms 39 about shaft 40.

The drive for the revolvable pick-up element constitutes a sprocket 42 secured to shaft 29 at one side where it projects through the bearing block 38 as shown in FIG. 1. Sprocket 42, in turn, is driven by a chain 43 extending forwardly to the sprocket 44. Sprocket 44, in turn, is secured to the lateral shaft 45 which is journaled in bearing 46 secured at a forward position on framework 10. The shaft 45 is driven directly from gear box 47 which, in turn, is powered through shaft 48 from a source of rotary power such as the power take-off of a tractor unit.

Another important feature of my invention resides in the flexible sheet 17 and its special mount to cooperate with tines 36 of the revolvable pick-up element 16 at all times. The flexible sheet 17 is disposed laterally of the framework 10 and hangs downwardly to drag upon the ground G during forward travel of the machine. The flexible sheet 17 is provided with a plurality of slits 49 which extend downwardly through the lower edge 50 of the sheet. It is intended that flexible sheet 17 ride over the top of rocks and stones upon ground G, yielding only locally because of the slits 49, to permit the rocks and stones to pass underneath and be encased by tines 36. A certain portion of the rocks and stones will be thrown forwardly so as to lie in engagement with the rear or trailing surface 51 of the flexible sheet element 17. The mass of rocks 52 will then be tumbled against one another so as to remove most of the mud and dirt which may cling thereto. As the mass of rocks 52 builds up, they will be ultimately lifted and cradled in the tines 36 as they travel rearwardly in their upper flight. The upper edge 53 of flexible sheet 17 is secured to a bar 54 which, in turn, is mounted on a pair of spaced radius arms 55, as shown in FIGS. 1 and 2. The radius arms 55, in turn, are pivoted at 56 to the bearing bracket 57 secured at a forward position to the framework 10. Since the bar 54 lies upon the framework 10 the normal position assumed by the flexible sheet 17 will be as disclosed in FIG. 2. However, if the accumulation of rocks or the size of any individual rock be such as would jam the operation of the tines 36 thereagainst, then the radius arms 55 will rise and relieve the pressure, permitting the rocks to pass thereunder without breaking or bending any of the machine parts.

The rock gathering and dumping assembly 18 is provided with a basket 58 provided, in turn, with a slatted bottom 59 and side walls 60, as shown in FIGS. 1 and 2. Stub shafts 61 extend medially outward from the end walls 60 and are pivotally mounted upon a pair of boom arms 62 which, in turn, are pivotally mounted at their upper ends to shaft 63 journaled across the rearmost ends of the angled members 15. A single action hydraulic ram 64 is pivoted at 65 to the lower end of upright 14 and is also pivoted at its upper end at pivot point 66 to the boom arms 62 a short distance away from the shaft 63. A sprocket 67 is rigidly secured to the stub shaft 61 at one side of the bucket or basket 58 and has a roller chain 68 in engagement therewith. The roller chain 68 is also trained about a sprocket 69 which in turn is mounted upon the shaft 63. A small hydraulic ram 70 is pivotally mounted at 71 to the brace 15 and is pivotally mounted at its other end to a crank pin 72 on the sprocket 69. A yoke 73 is secured to the forward edge 74 of bucket 58 and is adapted to engage an axle housing 75 surrounding the shaft 11 to which the rubber tired wheels 12 are secured. Yoke 73 serves to steady the basket 58 in its normal rock-receiving position, as shown in FIG. 2. A chain tightening element 76 is secured adjustably at 77 to the boom arm 62 associated with the sprocket 67. The chain 68 is thus kept in tight condition to prevent wobbling of the basket or bucket 58 during operation of the machine.

When it is desired to raise the bucket 58, the hydraulic ram 64 is supplied with hydraulic fluid from a source not shown, and the boom arms 62 are caused to rise radially about the shaft 63. The smaller hydraulic ram 70 at this point is caused to maintain its position and thereby hold the crank pin 72 in the position shown. Roller chain 68 will thus constitute an evener to maintain the basket 58 in upright position throughout the upward travel of boom arms 62, as illustrated by the cutaway dotted line configuration intermediate the extreme arcuate swings of the basket. When the basket is in its uppermost position, as shown in dotted line configuration in FIG. 2, the smaller hydraulic ram 70 is caused to extend and thereby turn the sprocket 69 through crank pin 72. The basket 58 will thus turn in a clockwise direction to dump its contents of rocks and stones. The ram 70 is two-way in character so that the sprocket 69 is rotated in a counterclockwise direction to return the pin 72 to its beginning position, as shown. When the normal operating position of the crank pin 72 has been attained, the ram 70 will maintain it in locked position until it is again desired to dump the basket. The one-way hydraulic ram 64 is then relieved of its pressure to permit the boom arms 62 to descend and the basket 58 will again come into its full line position with yoke 73 in contact with the axle housing 75. It will be noted that the boom arms 62 are angulated downwardly and slightly rearwardly so that the weight of the basket 58 and its contents of rocks and stones will tend to seat the same firmly against the axle housing 75. However, since the hydraulic ram 64 operates in only one direction, the basket 58 is free to swing rearwardly if it should strike a rock or other object too large to be picked up by the machine. The yielding of basket 58 will thus prevent any damage thereto and the large object can be independently removed as by blasting with dynamite.

Another condition which is provided for by the arrangement disclosed herein is that which may occur from overloading the basket 58 before dumping. If the tines 36 should strike rocks piled excessively in the basket 58, then the revolvable pick-up element can raise, together with its radius arms 39, and simultaneously the basket 58 can swing rearwardly.

It may thus be seen that, under the present invention, I have devised simple but efficient means for individually and cooperatively relieving stresses which may be incurred through unusual circumstances encountered by my rock picker.

It will, of course, be understood that various changes may be made in the form, details, arrangements and proportions of the parts without departing from the scope of my invention as set forth in the appended claims.

What I claim is:

1. A rock picker machine having a wheeled frame adapted to be drawn over rocky terrain, a revolvable element having a lower flight moving downwardly and forwardly and an upper flight moving rearwardly and upwardly, a plurality of tines secured to said revolvable element and having downwardly and forwardly curved end portions for digging and lifting rocks from the ground during their travel in the lower flight, a normally stationary mount for the revolvable pick-up element, said mount being pivotally secured on the frame on a horizontal axis, the entire mount and revolvable pick-up element raised by the tines striking an immovable object.

2. In a rock picker machine, a wheeled frame adapted to be drawn over rocky terrain, a revolvable pick-up element trained about a pair of spaced horizontal axes and having a lower flight moving downwardly and forwardly and an upper flight moving upwardly and rearwardly, a plurality of tines secured to said revolvable element and having downwardly and forwardly curved end portions for digging and lifting rocks from the ground during their travel in the lower flight, a vertically adjustable suspension mount secured forwardly on the revolvable pick-up element, and a pivot arm mount pivotally secured to a rear portion of the revolvable pick-up element and extending forwardly for pivotal connection with the frame, said pivotal arm mount and revolvable pick-up element being capable of yielding upwardly under excessive pressure during the rock gathering operation and resting upon the frame under normal operating conditions.

3. The structure set forth in claim 2, and a flexible sheet spaced forwardly of the normal orbital path of the revolvable pick-up element, said flexible sheet being pivotally mounted to the frame forwardly of the upper edge thereof and yieldable upwardly relative to the forward portion of said revolvable pick-up element whereby to create temporary enlargement of the clearance therebetween to pass large rocks.

4. A rock picker machine having a wheeled frame adapted to be drawn over rocky terrain, a revolvable pick-up element having a lower flight moving downwardly and forwardly and an upper flight moving rearwardly and upwardly, a plurality of tines secured to said revolvable element and having downwardly and forwardly curved end portions for digging and lifting rocks from the ground during their travel in the lower flight, a receiving bucket normally disposed to the rear and below said revolvable pick-up element, mounting means secured between the frame and the revolvable pick-up member yieldable upwardly to raise said revolvable pick-up member upon encountering dangerous stress, and mounting structure for said bucket movable rearwardly of the frame when struck by an immovable object during travel of the machine or when overloaded with rocks so as to engage the revolvable pick-up member, the yielding movement of each of the revolvable pick-up member and the bucket tending to increase the clearance therebetween.

5. The structure set forth in claim 4, wherein the frame is provided with an upstanding rear portion and the mount for the bucket consists of a pair of depending arms pivotally secured to the upper frame portion and pivotally secured at their lower ends below said wheeled frame to the bucket.

6. A rock picker machine having a wheeled frame adapted to be drawn over rocky terrain, a revolvable element having a lower flight moving downwardly and forwardly and an upper flight moving rearwardly and upwardly, a plurality of tines secured to said revolvable element and having downwardly and forwardly curved end portions for digging and lifting rocks from the ground during their travel in the lower flight, a mount disposed across the frame and lying in spaced parallel relation closely adjacent the pathway of the ends of the curved tines as they scoop upwardly and forwardly in traveling from the lower to the upper flight, a flexible sheet secured edgewise in said mount for dragging on the terrain forwardly of the revolvable element and tending to retain rocks and earth against the rearward face thereof, said mount pivotally mounted on said frame forwardly of the said upper edge of said sheet, said spaced parallel relation of said mount and the ends of said tines being of a greater extent when said mount is pivoted upwardly of said frame by rocks acting on said mount, said mount having abutting engagement with the frame on downward movement.

References Cited in the file of this patent

UNITED STATES PATENTS

| | | |
|---|---|---|
| 1,723,608 | Dott et al. | Aug. 6, 1929 |
| 2,812,029 | Sund | Nov. 5, 1957 |
| 2,852,082 | Petersen | Sept. 16, 1958 |